(12) United States Patent
Essing et al.

(10) Patent No.: US 12,103,876 B2
(45) Date of Patent: Oct. 1, 2024

(54) METHOD OF AND SYSTEM FOR PROCESSING A SLURRY CONTAINING ORGANIC COMPONENTS

(71) Applicant: SCW Systems B.V., Alkmaar (NL)

(72) Inventors: Gerardus Cornelis Otto Bernard Essing, Schoorl (NL); Douglas Scott Hendry, Durham, NC (US)

(73) Assignee: SCW SYSTEMS B.V., Schoorl (NL)

( * ) Notice: Subject to any disclaimer, the term of this patent is extended or adjusted under 35 U.S.C. 154(b) by 0 days.

(21) Appl. No.: 15/560,884

(22) PCT Filed: Mar. 24, 2016

(86) PCT No.: PCT/EP2016/056668
§ 371 (c)(1),
(2) Date: Sep. 22, 2017

(87) PCT Pub. No.: WO2016/151120
PCT Pub. Date: Sep. 29, 2016

(65) Prior Publication Data
US 2018/0119038 A1    May 3, 2018

(30) Foreign Application Priority Data
Mar. 26, 2015  (EP) .................................. 15161194

(51) Int. Cl.
*C02F 11/08*  (2006.01)
*B01J 3/00*  (2006.01)
(Continued)

(52) U.S. Cl.
CPC ............. *C02F 11/086* (2013.01); *B01J 3/008* (2013.01); *C01B 3/02* (2013.01); *C10L 3/06* (2013.01);
(Continued)

(58) Field of Classification Search
CPC . C10G 1/06; C10G 1/08; C10G 1/065; C10G 1/083; C10G 1/086
See application file for complete search history.

(56) References Cited

U.S. PATENT DOCUMENTS

| | | |
|---|---|---|
| 4,113,446 A | 9/1978 | Modell et al. |
| 4,338,199 A | 7/1982 | Modell |

(Continued)

FOREIGN PATENT DOCUMENTS

| | | |
|---|---|---|
| CN | 101818079 A | 9/2010 |
| CN | 101827645 A | 9/2010 |

(Continued)

OTHER PUBLICATIONS

Hong et al. (Supercritical water partial oxidation, Proceedings of the 2002 U.S. Doe Hydrogen Program Review) (Year: 2002).*

(Continued)

*Primary Examiner* — Youngsul Jeong
(74) *Attorney, Agent, or Firm* — Westman, Champlin & Koehler, P.A.

(57) ABSTRACT

A method of and a system for processing a slurry containing organic components, such as biomass, having a water contents of at least 50%, comprises a pump and heater or heat exchanger to bring the liquid in the slurry in a supercritical state. A reactor converts at least a part of the organic components in the slurry. A separator removes gaseous products from the converted slurry. A mixer adds fluid from the converted slurry to the slurry upstream from the reactor.

13 Claims, 1 Drawing Sheet

(51) Int. Cl.
*C01B 3/02* (2006.01)
*C10L 3/06* (2006.01)
*C02F 11/125* (2019.01)
*C02F 103/20* (2006.01)

(52) U.S. Cl.
CPC ............. *C01B 2203/0216* (2013.01); *C01B 2203/0805* (2013.01); *C02F 11/125* (2013.01); *C02F 2103/20* (2013.01); *C10L 2200/0469* (2013.01); *C10L 2290/04* (2013.01); *C10L 2290/06* (2013.01); *C10L 2290/08* (2013.01)

(56) References Cited

U.S. PATENT DOCUMENTS

| | | | |
|---|---|---|---|
| 5,543,057 A | 8/1996 | Whiting | |
| 2006/0096163 A1* | 5/2006 | Dickinson | C10G 1/00 44/552 |
| 2010/0287825 A1 | 11/2010 | Humphreys | |
| 2011/0127778 A1 | 6/2011 | Kinney | |

FOREIGN PATENT DOCUMENTS

| | | | | |
|---|---|---|---|---|
| CN | 202688157 U | 1/2013 | | |
| CN | 103936251 A | 7/2014 | | |
| CN | 104030427 A | 9/2014 | | |
| CN | 104355519 A | 2/2015 | | |
| JP | S57-004225 A | 1/1982 | | |
| JP | H09-511678 A | 11/1997 | | |
| JP | 2000-033355 A | 2/2000 | | |
| JP | 2001115174 A | 4/2001 | | |
| JP | 2003-106164 A | 4/2003 | | |
| JP | 2003-117597 A | 4/2003 | | |
| JP | 2004-300254 A | 10/2004 | | |
| JP | 2006021069 A | 1/2006 | | |
| JP | 2008-249207 A | 10/2008 | | |
| WO | 8103169 A1 | 11/1981 | | |
| WO | 2009015409 A1 | 2/2009 | | |
| WO | WO-2010003655 A2 * | 1/2010 | ............ | C02F 11/086 |
| WO | 20160151120 A1 | 9/2016 | | |
| WO | WO 2010/003655 A1 * | 1/2019 | ............ | C02F 11/08 |

OTHER PUBLICATIONS

Reddy et al. (Supercritical water gasification of biomass for hydrogen production, International Journal of Hydrogen Energy, vol. 39 (2014), pp. 6912-6926) (Year: 2014).*

International Search Report dated May 23, 2016 for corresponding International Application PCT/EP2016/056668 filed Mar. 24, 2016.
Written Opinion of the International Searching Authority dated Sep. 29, 2016 for corresponding International Application PCT/EP2016/056668, filed Mar. 24, 2016.
Bermejo, M.D. et al. "Supercritical Water Oxidation: A Technical Review". AlChE Journal, Nov. 2006, vol. 52, No. 11, pp. 3933-3951.
Kruse, A., "Supercritical water gasification", Society of Chemical Industry and John Wiley & Sons, Ltd, 2008, pp. 415-437.
Marrone, Ph. A., "Supercritical water oxidation—Current status of full-scale commercial activity for waste destruction", Journal of Supercritical Fluids 79 (2013), pp. 283-288.
IBoukis, N., et al. "Biomass gasification in supercritical water. Experimental progress achieved with the VERENA pilot plant." 15th European Biomass Conference & Exhibition 2007.
Table 15.10 from "Innovative Wastewater Treatment and Resource Recovery Technologies" (Juan M Lema and Sonia Suarez, 2017).
Pages 407, 409, and 618 from "Supercritical Fluid Technology for Energy and Environmental Applications" (Vladimkr Anikeev and Maohong Fan, 2014).
Report prepared by General Atomics for the United States Department of Energy. Jan. 2005.
European Office Action, mailed Feb. 28, 2019 for corresponding European Patent Application No. 16716832.0, filed Mar. 24, 2016.
Russian Office Action from the Patent Office of the Russian Federation for application No. 2017134428/05 (060594), mailed May 21, 2019.
Australian Examination Report from the Australian Patent Office for Australian patent application No. 2016238748, published Sep. 14, 2017, mailed Jun. 10, 2020.
First Office Action from Chinese Patent Office for Chinese patent application No. 201680017560.5, Jun. 18, 2020.
Brazilian Office Action dated Jan. 27, 2020, for corresponding Brazilian Patent Application No. 112017019837-1, filed Mar. 24, 2016.
Notice of Reasons for Rejection for Japanese patent application No. 2017-550606, mailed Feb. 3, 2020, with English translation.
Examination Report for Indian patent application No. 201747030214, mailed Jan. 31, 2020.
Chinese Office Action for Chinese patent application No. 201680017560.5, mailed Mar. 5, 2021, with English translation.
Japanese Office Action for Japanese patent application No. 2017-550606, mailed Feb. 1, 2021, with English translation.

* cited by examiner

METHOD OF AND SYSTEM FOR PROCESSING A SLURRY CONTAINING ORGANIC COMPONENTS

CROSS-REFERENCE TO RELATED APPLICATION

The present application is a national stage of and claims priority of International patent application Serial No. PCT/EP2016/056668, filed Mar. 24, 2016, and published in English as WO/2016/151120A1.

BACKGROUND

The invention relates to a method of and a system for processing a slurry containing organic components, such as biomass, having a water contents of at least 50%, preferably at least 60%, preferably at least 70%. The invention relates in particular to a method and a system for supercritical water gasification (SCWG) of organic components in a slurry.

Feedstocks containing organic components are a tremendous potential resource for providing energy and value-added products, especially in agricultural areas where waste biomass is abundant or where dedicated energy crops can be produced cheaply and efficiently.

SUMMARY

An improved method of and system for processing, preferably in a continuous process, a slurry containing organic components, such as biomass, to produce combustible gas, e.g. hydrogen and/or hydrocarbons is disclosed.

The method comprises:

increasing the pressure and temperature of the slurry to bring the liquid in the slurry in a supercritical state, typically by first increasing one of pressure and temperature beyond the supercritical threshold (for water: 221 bar and 374° C., respectively) and then increasing the other of pressure and temperature beyond the supercritical threshold, converting at least a part of the organic components in the slurry, e.g. to combustible gaseous products, e.g. to hydrogen and/or hydrocarbons, such as methane, e.g. by further heating the stream in a reactor, and separating gaseous products from the converted slurry, and mixing fluid, e.g. liquid water, water in a (near) supercritical state and/or a liquid fuel, with the slurry before converting at least a part of the organic components in the slurry.

In an embodiment, the method comprises mixing fluid from the converted slurry with the upstream slurry, preferably after the fluid from the converted slurry has been de-pressurized and/or cooled to a pressure and/or temperature below the critical pressure and/or critical temperature and/or preferably before the liquid in the (upstream) slurry is brought in a supercritical state, preferably before the liquid in the (upstream) slurry is pressurized above critical pressure and/or heated to a temperature above the critical temperature.

In another embodiment, the fluid mixed with the slurry is taken from an external source, e.g. a neighbouring plant.

The method enables processing of feedstocks with a relatively high contents of organic components and/or solids, provides efficient heat recovery and/or enhances subsequent pumping and heat exchange by reducing viscosity of the slurry and/or enhancing mixing.

In an embodiment, the method comprises separating gaseous products and/or solids from the fluid in the converted slurry and mixing the fluid thus obtained with the upstream slurry.

In another embodiment, to further improve overall heat recovery, the method comprises exchanging heat between the (relatively hot) converted slurry and the (relatively cold) slurry before conversion, preferably after the latter has been mixed with fluid from the converted slurry.

In a refinement, heat is exchanged between the converted slurry and the upstream slurry to heat the latter to a temperature above the critical temperature.

In an embodiment, the method comprises reducing the percentage of water in the slurry, preferably by dewatering the slurry and/or by adding a substance containing less water than the initial slurry, preferably at least before mixing the slurry with fluid from the converted stream. In a refinement, the slurry is dewatered to a total solids contents of at least 20%, preferably at least 30%, preferably at least 40%. First removing liquid from the feedstock and then adding fluid from the process appeared to be an effective means to further increase process efficiency.

In an embodiment, to increase the caloric value of the slurry, the method comprises adding a fuel, e.g. a solid fuel such as (powdered) coal or a liquid fuel such as an alcohol, e.g. glycerol, or a hydrocarbon, e.g. paraffin, to the slurry, before converting at least a part of the organic components in the slurry. The fuel can double as a means to reduce the percentage of water in the slurry.

A system for processing a slurry containing organic components, such as biomass, having a water contents of at least 50%, preferably at least 60%, preferably at least 70%, includes a pump and heater or heat exchanger to bring the liquid in the slurry in a supercritical state. A reactor converts at least a part of the organic components in the slurry. A separator removes gaseous products from the converted slurry. A mixer adds fluid, preferably fluid from the converted slurry, to the slurry upstream from the reactor.

In an embodiment, the downstream end of the reactor is connected, preferably via at least a separator, to the mixer.

In another embodiment, the mixer is located upstream from at least one of the pump and the heater or heat exchanger for bringing the liquid in the slurry in a supercritical state.

In another embodiment, the system comprises a separator for removing gaseous products and/or a separator for removing solids from the fluid in the converted slurry.

In another embodiment, the system comprises a heat exchanger for transferring heat from the converted slurry to the non-converted slurry and located upstream from the reactor and preferably located downstream from the mixer.

In another embodiment, the system comprises a solid-liquid separator, a screw press, filter press, centrifuge, or dryer, to dewater the feed slurry and preferably located upstream from the mixer.

In another embodiment a system includes a pump for pressurizing the liquid in the slurry to a supercritical pressure, a heater or heat exchanger, a reactor, and a separator as specified above, wherein the pump is an hydraulic pump and comprises a circuit for a cooling medium, which circuit separates the hydraulic medium from the slurry, thus providing effective cooling and reducing the risk of contamination, in case of a leak, of the hydraulic medium with the slurry or vice versa.

BRIEF DESCRIPTION OF THE DRAWINGS

Aspects of the invention will now be explained in more detail with reference to the figures, which schematically show an embodiment.

DETAILED DESCRIPTION

Figure 1:
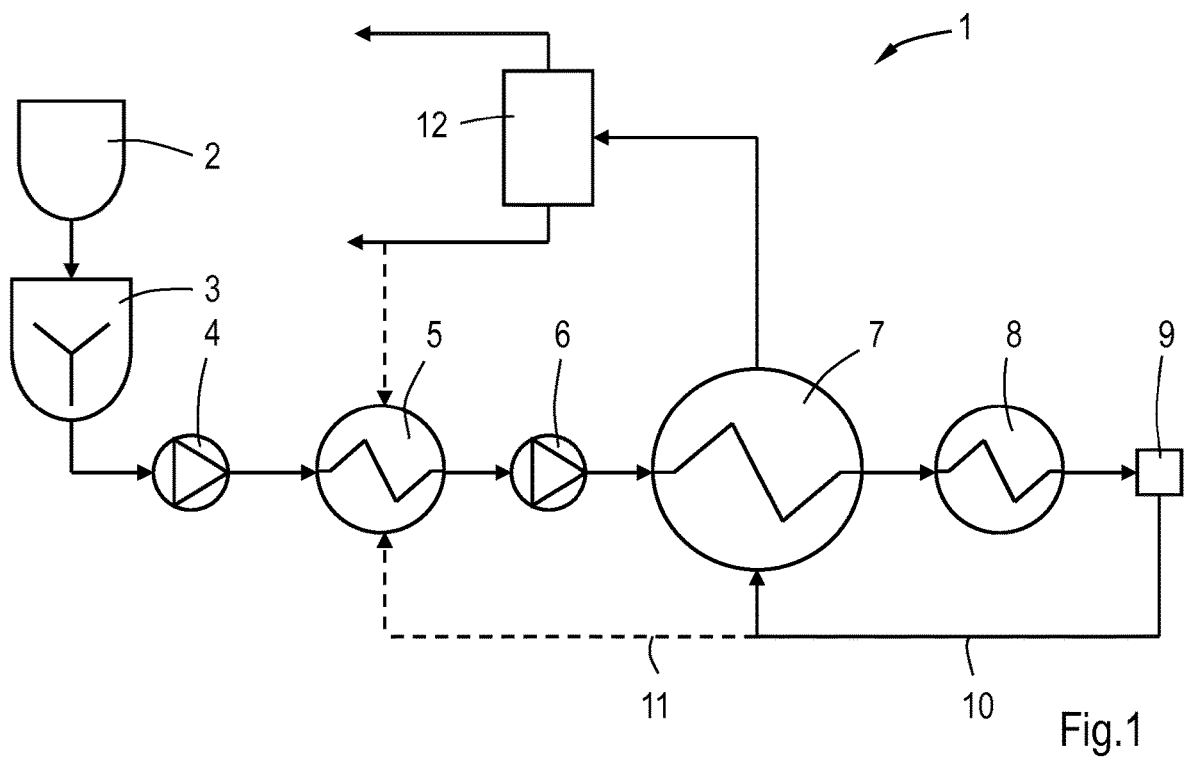
FIG. 1 is a flow diagram of an embodiment of a system for supercritical water gasification.

FIG. 1 shows a system 1 for processing a slurry containing organic components, such as biomass, having a water contents of at least 50%, comprising a solid-liquid separator 2, such as a screw press, filter press, centrifuge, or dryer, to dewater the feed slurry and a tank 3 for holding the dewatered slurry. The tank is connected to a pump 4 which in turn is connected to or integrated with a mixer 5 for adding liquid to the slurry, e.g. liquid from the downstream (processed) slurry. Downstream from the mixer 5 are a high-pressure pump 6, shown in more detail in FIG. 2, and a heat exchanger 7 to pressurize and heat the water in the slurry to supercritical or near-supercritical conditions. In an example, the heat exchanger comprises one or more counter-current tube-in-tube heat exchanger sections, e.g. two, four or more tube-in-tube heat exchanger sections, arranged in series. Downstream from the pump 6 and (first) heat exchanger 7 is a further heat exchanger, which serves as a reactor 8. In an example, the reactor comprises one or more tubes extending through a furnace.

The downstream end of the reactor and optionally also of the (first) heat exchanger is connected to a solids trap 9 to remove solids, such as inorganics and/or precipitated minerals and salts, from the system.

In a first embodiment, indicated by a solid line 10 in FIG. 1, the downstream end of the reactor 8 is connected to the outer tube of the first heat exchanger 7, to provide counter-current heat exchange between the (relatively hot) converted slurry and the (relatively cold) slurry before conversion. The outer tubes of the first heat exchanger 7 are connected to gas-liquid separator 12, to separate the gaseous products from the liquid. The bottom of the separator is connected to the mixer 5 to add at least part of the (recycled) liquid to the slurry.

In a second embodiment, indicated by a dotted line 11 in FIG. 1, the downstream end of the reactor 8 is connected to the mixer and optionally also to outer tube of the first heat exchanger, to add at least part of the fluid from the reactor directly to the slurry.

Figure 2:
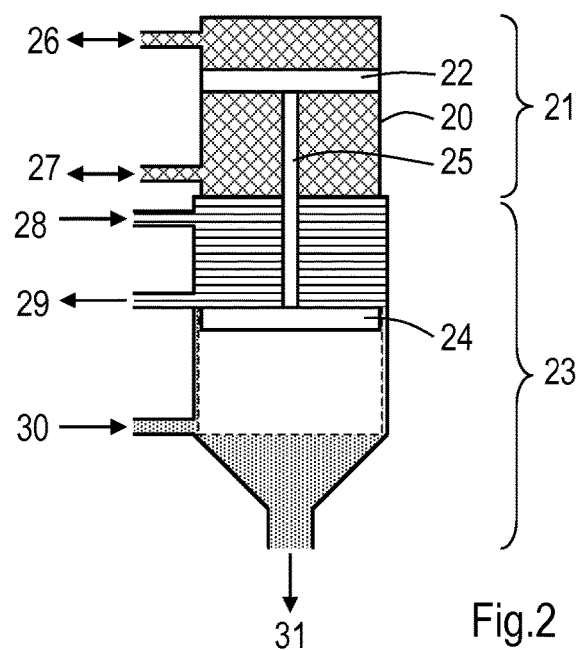
FIG. 2 is a schematic cross-section of a high-pressure pump.

As shown in more detail in FIG. 2, the high-pressure pump 6 comprises a cylindrical housing 20 comprising two compartments, a first compartment 21 accommodating a first piston 22 and a second compartment 23 accommodating second piston 24, connected to the first piston via a piston rod 25. The first compartment 21 comprises two ports 26, 27 connected via a hydraulic control valve (not shown) to a source of hydraulic fluid for both the retraction and extension of the piston rod and second piston, i.e. it is a double-acting hydraulic cylinder. The second compartment 23 comprises, in a section adjacent to the first compartment an inlet 28 and an outlet 29 for a cooling medium, and, on the other side of the second piston an inlet 30 and an outlet 31 for the slurry. This latter inlet and outlet are provided with non-return valves (not shown), such that when the pistons and rod are retracted (move up in FIG. 2), slurry is sucked in via the inlet and the outlet is blocked and that when the pistons and rod are extended (down up in FIG. 2), slurry is pressurized and fed to the mixer. In an example, to facilitate continuous operation, the system comprises two pumps in parallel.

During operation, in an example, wet biomass (manure) having a water content of 80% is dewatered by means of a screw press 2 to a water content of 70% (totals solids 30%) and the thickened and viscous slurry is fed to the tank 3. From there, the slurry is pumped (at 1000 liters/hour, 15-20 bar, and 15° C.) to the mixer 5 and mixed with water (750-1250 nL/h, 15-30 bar, and 250-300° C.) from the downstream, processed slurry, to a water content of 83-87% and a volume of 1750-2250 nL/h. The slurry is then pressurized and heated (240-250 bar, and 370-390° C.) and fed to the reactor, where the slurry is further heated (to 550-600° C.) to convert at least a part of the organic components in the slurry to gaseous product, e.g., hydrogen and methane. After conversion, solids are removed from slurry in a solids trap and the water is fed to the first heat exchanger 7 to recover high temperature heat, i.e. to heat the colder upstream slurry. After leaving the heat exchanger (at 1750-2250 nL/h, 240-250 bar, and 250-300° C.), the liquid is fed to the gas/liquid separator to allow the gaseous product to escape and to enable collection. Part of the remaining water is discharged from the system and part of the remaining water (750-1250 nL/h) is mixed with the upstream slurry.

The method and system enables processing of feedstocks with a relatively high contents of organic components and/or solids, provides efficient heat recovery and/or enhances subsequent pumping and heat exchange by reducing viscosity of the slurry and/or enhancing mixing.

The invention is not restricted to the above-described embodiments, which can be varied in a number of ways within the scope of the claims.

The invention claimed is:

1. A method of processing a slurry containing organic components and water, comprising:
   in a reducing step, reducing a percentage of water of the slurry to form an intermediate composition;
   in a mixing step, transporting the intermediate composition to a mixer and increasing the water content by mixing the intermediate composition with a hot process water to form a ready mix;
   increasing pressure and temperature of the ready mix to bring the water in the ready mix to a supercritical state;
   transporting the ready mix via a heat exchanger to a reactor;
   in a converting step in the reactor, converting through supercritical water gasification at least a part of the organic components in the ready mix to hydrogen and one or more hydrocarbons to produce a converted slurry;
   separating solids from the converted slurry into separated water and solids;
   recycling at least some of the separated water from the converted slurry as a heat exchanging counter current via said heat exchanger to a gas-liquid gas-liquid separator to separate the hydrogen and hydrocarbons;
   recycling at least some of the separated water as the hot process water in the mixing step, so as to recycles heat used in the converting step.

2. The method according to claim 1, wherein the method further comprising exchanging heat between some of the water separated from the converted slurry and the ready mix before the converting step.

3. The method according to claim 2, wherein the method further comprising exchanging heat between some of the water separated from the converted slurry and the ready mix to aid in heating the ready mix to a temperature above the critical temperature of water.

4. The method according to claim 1, comprising adding a fuel to the ready mix before converting at least a part of the organic components in the ready mix.

5. The method of claim 1, wherein the mixing step is conducted before the water in the ready mix is brought into the supercritical state where the water in the ready mix is pressurized above the critical pressure of water and/or heated to a temperature above the critical temperature of water.

6. The method of claim 2, wherein the exchanging heat between some of the water separated from the converted slurry and the ready mix occurs after the mixing step.

7. The method of claim 1, wherein the reducing the percentage of water of the slurry comprises dewatering the slurry.

8. The method of claim 1, wherein the reducing the percentage of water of the slurry comprises adding a substance containing less water than the slurry.

9. The method of claim 1, wherein the ready mix has a water content of at least 50% by weight prior to the converting step.

10. The method of claim 1, wherein the ready mix has a water content that is greater than the water content of the slurry prior to the reducing step.

11. The method of claim 1, wherein the ready mix after the mixing step has a water content that is greater than the water content of the slurry prior to the reducing step.

12. A method of processing a first aqueous slurry containing organic components, the method comprising:

in a reducing step, reducing water content of the first aqueous slurry to form a second aqueous slurry;

increasing pressure and temperature of the second aqueous slurry to bring the water in the second aqueous slurry into a supercritical state;

in a converting step, converting through supercritical water gasification at least a part of the organic components in the second aqueous slurry to hydrogen and/or one or more hydrocarbons to produce a converted slurry while adding heat;

processing the converted slurry through a solids trap to remove solids from the converted slurry;

in a heat exchanging step, heat exchanging at least some of the converted slurry after being processed through the solids trap with the second aqueous slurry after the reducing step and before the converting step to recycle heat used in the converting step;

separating the hydrogen and/or one or more hydrocarbons from the at least some of converted slurry after the heat exchanging step.

13. The method of claim 12, wherein the second aqueous slurry has a water content of at least 50% by weight after separating the hydrogen and/or one or more hydrocarbons from the converted slurry and recycling the-at least some of an aqueous fluid of the converted slurry after the separation of the hydrogen and/or one or more hydrocarbons therefrom to the second aqueous slurry.

* * * * *